US010379602B2

(12) United States Patent
Lin et al.

(10) Patent No.: US 10,379,602 B2
(45) Date of Patent: Aug. 13, 2019

(54) METHOD AND DEVICE FOR SWITCHING ENVIRONMENT PICTURE

(71) Applicant: BEIJING XIAOMI MOBILE SOFTWARE CO., LTD., Beijing (CN)

(72) Inventors: Xingsheng Lin, Beijing (CN); Xuanran Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/717,322

(22) Filed: Sep. 27, 2017

(65) Prior Publication Data
US 2018/0088664 A1 Mar. 29, 2018

(30) Foreign Application Priority Data

Sep. 27, 2016 (CN) .......................... 2016 1 0855556

(51) Int. Cl.
*G06F 3/01* (2006.01)
*G06F 3/0487* (2013.01)
(Continued)

(52) U.S. Cl.
CPC ............ *G06F 3/011* (2013.01); *G06F 3/0487* (2013.01); *G06F 3/04815* (2013.01); *H04N 5/23203* (2013.01)

(58) Field of Classification Search
CPC ....... G06G 3/011; G06F 3/0487; G06F 3/011; G06F 3/04815; H04N 5/23203
See application file for complete search history.

(56) References Cited

U.S. PATENT DOCUMENTS

2006/0035679 A1\* 2/2006 Han .................... G06F 3/04815
455/566
2009/0293012 A1 11/2009 Alter et al.
(Continued)

FOREIGN PATENT DOCUMENTS

CN 104216520 A 12/2014
CN 105044915 A 11/2015
(Continued)

OTHER PUBLICATIONS

Extended European Search Report dated Feb. 21, 2018 in Patent Application No. 17193534.9, citing documents AA-AF and AO therein, 12 pages.
(Continued)

*Primary Examiner* — Alexander Eisen
*Assistant Examiner* — Cory A Almeida
(74) *Attorney, Agent, or Firm* — Oblon, McClelland, Maier & Neustadt, L.L.P.

(57) ABSTRACT

The disclosure relates to a method and device for managing a virtual environment. The method includes displaying a virtual environment image via a device; measuring an acceleration of the device via an acceleration sensor; comparing a variation of the acceleration to a variation threshold; determining whether the variation of the acceleration is greater than the variation threshold; when the variation of the acceleration is greater than the variation threshold, transmitting a first request for a real environment image to a terminal that is configured to capture the real environment image via a camera in response to the first request; receiving the real environment image from the terminal; and displaying the real environment image instead of the virtual environment image via the device.

10 Claims, 8 Drawing Sheets

(51) Int. Cl.
    *G06F 3/0481*    (2013.01)
    *H04N 5/232*     (2006.01)

(56) References Cited

U.S. PATENT DOCUMENTS

| | | | |
|---|---|---|---|
| 2011/0248918 A1 | 10/2011 | Yoo et al. | |
| 2012/0062470 A1 | 3/2012 | Chang | |
| 2013/0318472 A1* | 11/2013 | Liao | G06F 3/0481 |
| | | | 715/802 |
| 2014/0204002 A1 | 7/2014 | Bennet et al. | |

FOREIGN PATENT DOCUMENTS

| | | | |
|---|---|---|---|
| CN | 105872529 A | * | 8/2016 |
| CN | 105872529 A | | 8/2016 |
| CN | 105894584 A | | 8/2016 |
| EP | 2 662 751 A1 | | 11/2013 |

OTHER PUBLICATIONS

Combined Chinese Office Action and Search Report dated Dec. 18, 2018 in Chinese Patent Application No. 201610855556.8 (with English translation of Category of Cited Documents), citing documents AO through AR therein, 7 pages.

* cited by examiner

METHOD AND DEVICE FOR SWITCHING ENVIRONMENT PICTURE

CROSS-REFERENCE TO RELATED APPLICATIONS

This application is filed based upon and claims priority to Chinese Patent Application Serial No. CN 201610855556.8, filed with the State Intellectual Property Office of P. R. China on Sep. 27, 2016, the entire contents of which are incorporated herein by reference.

TECHNICAL FIELD

The present disclosure generally relates to the technical field of virtual reality, and more particularly, to a method and device for switching an environment picture.

BACKGROUND

A virtual reality technology is a technology for simulating a virtual environment to simulate a perceptive function for a user by way of virtual reality equipment, and by the virtual reality technology. The user may participate in the virtual environment to obtain an immersive experience by completely utilizing his/her own vision, hearing, touch smell and body, a gesture, a command, or the like.

Virtual reality equipment usually consists of terminal equipment and sensing equipment. The terminal equipment provides a virtual environment picture for the sensing equipment. The sensing equipment generates a virtual environment and displays the virtual environment picture in the virtual environment. A user may enter the virtual environment and view the virtual environment picture after wearing the sensing equipment.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for managing a virtual environment. The method includes displaying a virtual environment image via a device; measuring an acceleration of the device via an acceleration sensor; comparing a variation of the acceleration to a variation threshold; determining whether the variation of the acceleration is greater than the variation threshold; when the variation of the acceleration is greater than the variation threshold, transmitting a first request for a real environment image to a terminal that is configured to capture the real environment image via a camera in response to the first request; receiving the real environment image from the terminal; and displaying the real environment image instead of the virtual environment image via the device.

The method also includes measuring a distance between the device and a user via a distance sensor; determining whether the distance is less than a distance threshold; and when the variation of the acceleration is greater than the variation threshold and the distance is less than the distance threshold, transmitting the first request for the real environment image to the terminal.

The method also includes detecting a recovery operation of the user while the real environment image is displayed via the device; transmitting a second request for the virtual environment image to the terminal; receiving the virtual environment image from the terminal; and displaying the virtual environment image instead of the real environment image via the device.

Aspects of the disclosure also provide a device for managing a virtual environment. The device includes a processor and a memory configured to store instructions executable by the processor. The processor is configured to display a virtual environment image via a device; measure an acceleration of the device via an acceleration sensor; compare a variation of the acceleration to a variation threshold; determine whether the variation of the acceleration is greater than the variation threshold; when the variation of the acceleration is greater than the variation threshold, transmit a first request for a real environment image to a terminal that is configured to capture the real environment image via a camera in response to the first request; receive the real environment image from the terminal; and display the real environment image instead of the virtual environment image via the device.

The processor is also configured to measure a distance between the device and a user via a distance sensor; determine whether the distance is less than a distance threshold; and when the variation of the acceleration is greater than the variation threshold and the distance is less than the distance threshold, transmit the first request for the real environment image to the terminal.

The processor is also configured to detect a recovery operation of the user while the real environment image is displayed via the device; transmit a second request for the virtual environment image to the terminal; receive the virtual environment image from the terminal; and display the virtual environment image instead of the real environment image via the device.

Aspects of the disclosure also provide a device for managing a virtual environment. The device includes a processor and a memory configured to store instructions executable by the processor. The processor is configured to receive a first request for a real environment image from a device that is configured to transmit the first request upon a determination that a variation of a measured acceleration of the device is greater than a variation threshold; capture the real environment image via a camera in response to the first request; and transmit the real environment image to the device that is further configured to display the real environment image instead of a virtual environment image upon receipt of the real environment image.

The processor is also configured to store the virtual environment image in response to receiving the first request; receive a second request for the virtual environment image from the device; retrieve the virtual environment image from storage in response to receiving the second request; and transmit the virtual environment image to the device that is further configured to display the virtual environment image instead of the real environment image upon receipt of the virtual environment image.

The processor is also configured to store the virtual environment image in response to receiving the first request; detect a deactivation of the camera; retrieve the virtual environment image from storage in response to the deactivation of the camera; and transmit the virtual environment image to the device that is further configured to display the virtual environment image instead of the real environment image upon receipt of the virtual environment image.

Aspects of the disclosure also provide a non-transitory computer-readable storage medium having stored therein instructions. When the instructions are executed by one or more processors of a device, they cause the device to display a virtual environment image via the device; measure an acceleration of the device via an acceleration sensor; compare a variation of the acceleration to a variation threshold; determine whether the variation of the acceleration is greater than the variation threshold; when the variation of the acceleration is greater than the variation threshold, transmit a first request for a real environment image to a terminal that is configured to capture the real environment image via a camera in response to the first request; receive the real environment image from the terminal; and display the real environment image instead of the virtual environment image via the device.

It is to be understood that the above general description and the detailed description below are only exemplary and explanatory and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations matched with the present disclosure. Instead, they are merely examples of apparatuses and methods matched with aspects related to the present disclosure as recited in the appended claims.

Certain terms used in the present disclosure are only intended to describe specific aspects, but are not intended to limit the present disclosure. For example, singular form words "a," "said," and "the" used in the present disclosure and the appended claims are intended to include plural form, unless otherwise clearly stated. Also, the term "and/or" used herein refers to any or all combinations of one or more listed related items. The word "if" used here may be interpreted as "at the moment when . . . " or "when . . . " or "in response to confirmation".

It is to be noted that although the flowcharts in some exemplary aspects describe each step as a sequenced process, a variety of steps therein may be implemented in parallel, concurrently or simultaneously. In addition, the sequence of all steps may be re-arranged. When the operation is completed, the process may be ended, but additional steps not included in the accompanying drawings may be executed. The process may correspond to a method, a function, a regulation, a sub-routine, a sub-program and the like.

The aspects of the present disclosure provide a method and device for switching an environment picture (e.g., image). The present disclosure will be described below in detail with reference to the accompanying drawings.

Figure 1:
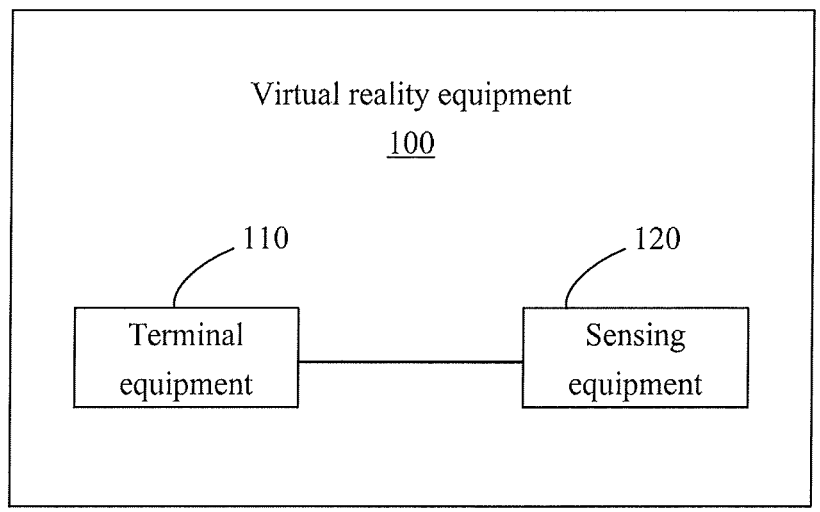
FIG. 1 is a schematic diagram of architecture of virtual reality equipment, according to an exemplary aspect of the present disclosure.

FIG. 1 is a schematic diagram of architecture of virtual reality equipment 100, according to an exemplary aspect. As shown in FIG. 1, the virtual reality equipment 100 at least includes terminal equipment 110 and sensing equipment 120.

The terminal equipment 110 provides the sensing equipment 120 with specific data of an environment picture. The sensing equipment 120 displays the environment picture according to the data provided by the terminal equipment 110. When the terminal equipment 110 provides a virtual environment picture for the sensing equipment 120, the sensing equipment 120 displays the virtual environment picture. When the terminal equipment 110 provides a real environment picture for the sensing equipment 120, the sensing equipment 120 displays the real environment picture.

In a possible implementation mode, the terminal equipment 110 and the sensing equipment 120 are different pieces of equipment. The terminal equipment 110 and the sensing equipment 120 may be connected through a signal wire or connected through a network to form virtual reality equipment. In another possible implementation mode, the terminal equipment 110 and sensing equipment 120 in the virtual reality equipment 100 form an integrated structure. An architecture of the virtual reality equipment 100 is not limited in the aspect.

Figure 2:
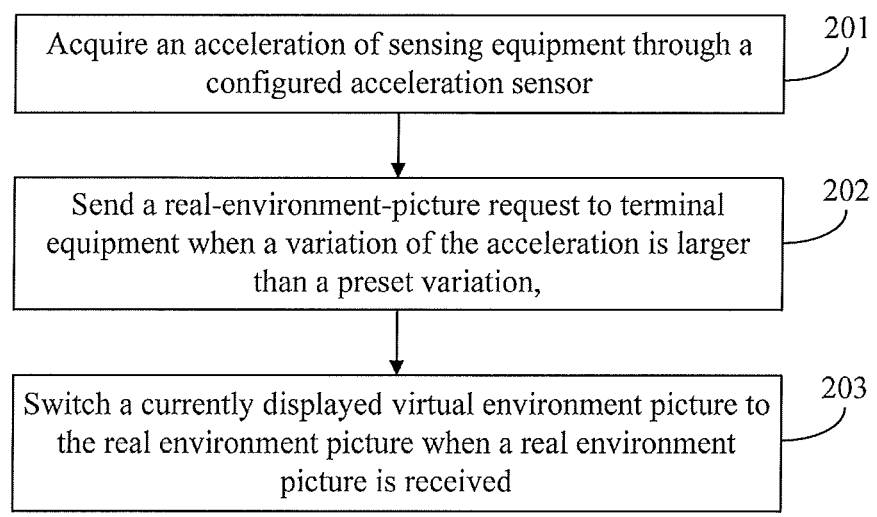
FIG. 2 is a flow chart showing a method for switching an environment picture, according to an exemplary aspect of the present disclosure.

FIG. 2 is a flow chart showing a method for switching an environment picture, according to an exemplary aspect. As shown in FIG. 2, the method for switching an environment picture is applied to sensing equipment shown in FIG. 1, and includes the following steps.

In Step 201, an acceleration of the sensing equipment is acquired through a configured acceleration sensor.

In Step 202, when a variation of the acceleration is larger than a preset variation (e.g., a threshold), a real-environment-picture request is sent to terminal equipment.

In Step 203, when a real environment picture is received, a currently displayed virtual environment picture is switched to the real environment picture.

In the related technology, a user may see no real environment picture but a virtual environment picture after entering a virtual environment through virtual reality equipment. Once an emergency happens in a real environment, the user cannot timely process it. In the aspect, the sensing equipment may switch the virtual environment picture to a real environment picture to further, thereby ensuring that the user may see the real environment picture when the variation of the acceleration is larger than the preset variation.

According to the method provided by the aspect, the acceleration of the sensing equipment is acquired through the sensing equipment, a real-environment-picture request is sent to the terminal equipment when the variation of the acceleration is larger than the preset variation. The terminal equipment turns on the camera on the terminal equipment according to the real-environment-picture request, acquires a real environment picture, and sends the real environment picture to the sensing equipment. The sensing equipment switches the virtual environment picture to a real environment picture. Therefore, when the acceleration greatly varies, the user may be ensured to timely see a real environment picture and know about a real environment to further timely process an emergency in the real environment. Safety is thus improved.

In a possible implementation mode, the step that the real-environment-picture request is sent to the terminal equipment when the variation of the acceleration is larger than the preset variation includes that:

a distance between the sensing equipment and a user is acquired through a configured distance sensor; and when the variation of the acceleration is larger than the preset variation and the distance is smaller than a preset distance, the real-environment-picture request is sent to the terminal equipment.

In another possible implementation mode, the method further includes that:

when a preset recovery operation of the user is detected in a virtual environment in a process of displaying a real environment picture, a virtual-environment-picture request is sent to the terminal equipment, the terminal equipment being configured to return a virtual environment picture; and when the virtual environment picture is received, a currently displayed real environment picture is switched to the virtual environment picture.

All of the above-mentioned optional technical solutions may be freely combined to form optional aspects of the present disclosure, which will not be elaborated herein one by one.

Figure 3:
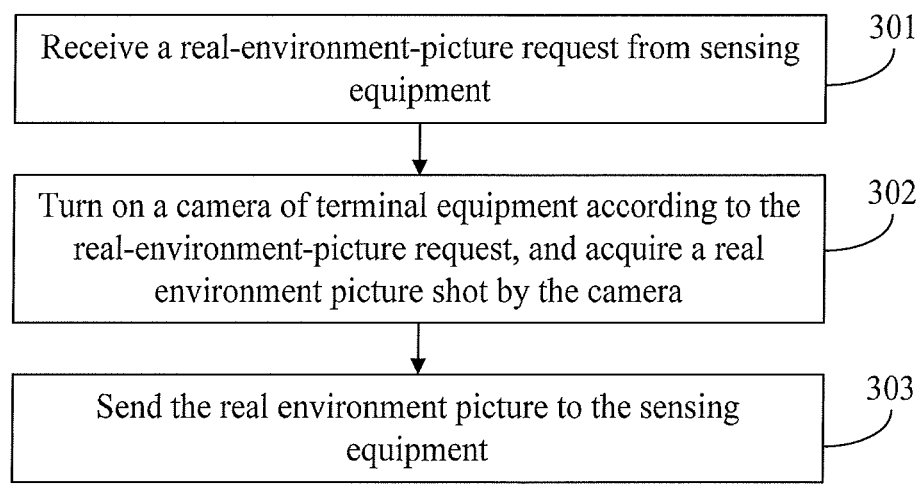
FIG. 3 is a flow chart showing a method for switching an environment picture, according to another exemplary aspect of the present disclosure.

FIG. 3 is a flow chart showing a method for switching an environment picture, according to an exemplary aspect. As shown in FIG. 3, the method for switching an environment picture is applied to terminal equipment shown in FIG. 1, and includes the following steps.

In Step 301, a real-environment-picture request sent by sensing equipment is received.

In Step 302, a camera of the terminal equipment is turned on according to the real-environment-picture request, and a real environment picture shot by the camera is acquired.

In Step 303, the real environment picture is sent to the sensing equipment.

According to the method provided by the aspect, an acceleration of the sensing equipment is acquired through the sensing equipment, a real-environment-picture request is sent to the terminal equipment when a variation of the acceleration is larger than a preset variation, the terminal equipment turns on the camera on the terminal equipment according to the real-environment-picture request, acquires a real environment picture, and sends the real environment picture to the sensing equipment, and the sensing equipment switches a virtual environment picture to the real environment picture. Therefore, when the acceleration greatly varies, a user may be ensured to timely see a real environment picture and know about a real environment so as to further timely process an emergency in the real environment, and safety is thus improved.

In a possible implementation mode, the method further includes that:

when a virtual-environment-picture request sent by the sensing equipment is received, a virtual environment picture which is stored when the real-environment-picture request is received is acquired; and the virtual environment picture is sent to the sensing equipment, the sensing equipment being configured to switch a currently displayed real environment picture to the virtual environment picture.

In another possible implementation mode, the method further includes that:

when a turning-off operation of a user over the camera is detected, a virtual environment picture which is stored when the real-environment-picture request is received is acquired; and the virtual environment picture is sent to the sensing equipment, the sensing equipment being configured to switch a currently displayed real environment picture to the virtual environment picture.

All of the above-mentioned optional technical solutions may be freely combined to form optional aspects of the present disclosure, which will not be elaborated herein one by one.

Figure 4:
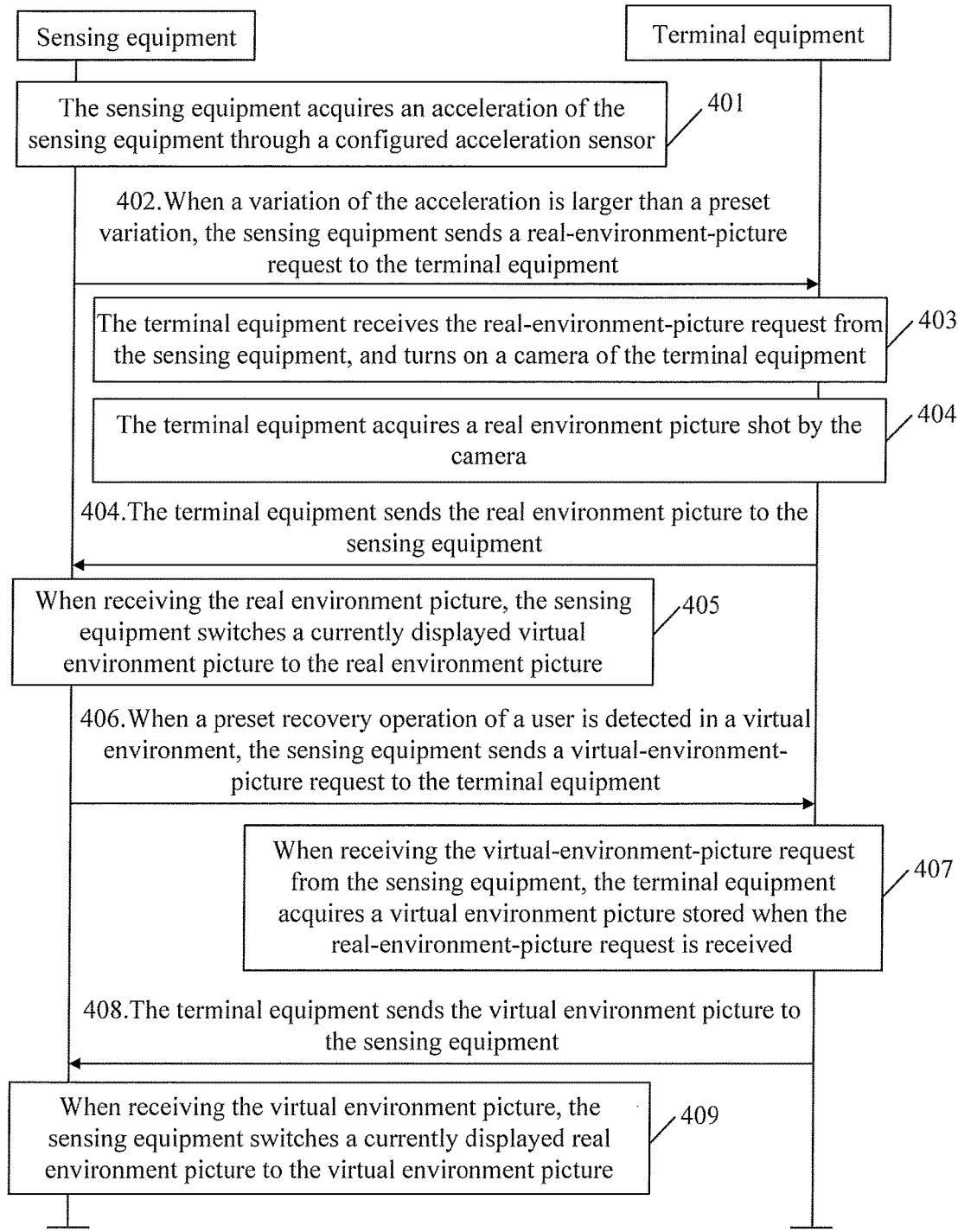
FIG. 4 is a flow chart showing a method for switching an environment picture, according to an exemplary aspect of the present disclosure.

FIG. 4 is a flow chart showing a method for switching an environment picture, according to an exemplary aspect. As shown in FIG. 4, main entities for interaction in the aspect are sensing equipment and terminal equipment as shown in FIG. 1, and the following steps are included.

In Step 401, the sensing equipment acquires an acceleration of the sensing equipment through a configured acceleration sensor.

The sensing equipment may be a virtual reality headset, virtual reality glasses and the like, which is not limited in the aspect. The sensing equipment is configured to provide a virtual environment for a user. After wearing the sensing equipment, the user may enter the virtual environment, view a virtual environment picture in the virtual environment and execute an operation. The operation in the virtual environment may include that the user may produce a movement or trigger an operation on a handle connected with the sensing equipment or produce a sound or the like in the virtual environment, which is not limited in the aspect.

The sensing equipment and the terminal equipment form virtual reality equipment. The terminal equipment may be a computer, a smart phone and the like, which is not limited in the aspect. The sensing equipment and the terminal equipment may be connected through a signal wire, or may also be connected through a network. Or, the sensing equipment and the terminal equipment may form an integrated structure, which is not limited in the aspect.

The sensing equipment is also provided with an acceleration sensor. The acceleration of the sensing equipment may be measured through the acceleration sensor. Since the user may enter a virtual environment only after wearing the sensing equipment, the acceleration of the sensing equipment may be considered as an acceleration of the user. In a process of displaying a virtual environment picture, the sensing equipment may acquire the acceleration of the user through the acceleration sensor and know about a current state of the user according to a variation of the acceleration, thereby executing a corresponding response operation.

In Step 402, when a variation of the acceleration is larger than a preset variation, the sensing equipment sends a real-environment-picture request to the terminal equipment.

When the variation of the acceleration is larger than the preset variation, it is indicated that the acceleration of the sensing equipment excessively varies and it is probable that the user suddenly squats down or suddenly falls down, that is, an emergency happens to the user. In order to timely process such an emergency, the sensing equipment sends a real-environment-picture request to the terminal equipment to request for displaying a real environment picture.

When the variation of the acceleration is not larger than the preset variation, it is indicated that the acceleration of the sensing equipment does not greatly vary, that is, the current state of the user is normal, and no emergency such as sudden squatting down and sudden falling down happens. Therefore, the sensing equipment is not needed to display the real environment picture, but continues displaying the current virtual environment picture.

The preset variation may be determined according to a variation of an acceleration when a common person suddenly squats down or suddenly falls down, which is not limited in the aspect.

Upon the determination of whether the variation of the acceleration is larger than the preset variation or not, switching to the real environment picture can be timely implemented when an emergency is likely to happen to the user. Safety is thus improved.

The sensing equipment may also be configured with a distance sensor, and the distance sensor is configured to measure a distance between the user and the sensing equipment. When the distance, measured by the distance sensor, between the user and the sensing equipment is smaller than a preset distance, it is indicated that the user is using the sensing equipment. When the distance, measured by the distance sensor, between the user and the sensing equipment is not smaller than the preset distance, it is indicated that the user currently does not use the sensing equipment. The preset distance may be determined according to a distance between the user wearing the sensing equipment and the sensing equipment, which is not limited in the aspect.

In a possible implementation mode, when the variation of the acceleration is larger than the preset variation and the distance measured by the distance sensor is smaller than the preset distance, it is indicated that the user is using the sensing equipment and the emergency probably happens. The sensing equipment sends a real-environment-picture request to the terminal equipment to request for displaying a real environment picture to further enable the user to see the real environment picture.

In another possible implementation mode, when the variation of the acceleration is not larger than the preset variation, or, when the distance is not smaller than the preset distance, the sensing equipment continues displaying the current virtual environment picture without any other operation.

When no emergency happens to the user, no matter whether the user wears the sensing equipment or not, a virtual environment picture may be continued to be displayed, while a real environment picture is not needed to be displayed. When the user does not wear the sensing equipment, the real environment may be directly seen, and at this moment, even though the emergency happens to the user, the sensing equipment is not needed to display the real environment picture. Therefore, when the variation of the acceleration is not larger than the preset variation, or, when the distance is not smaller than the preset distance, the sensing equipment continues displaying the current virtual environment picture.

In Step 403, the terminal equipment receives the real-environment-picture request from the sensing equipment, and turns on a camera of the terminal equipment.

In Step 404, the terminal equipment acquires a real environment picture shot by the camera, and sends the real environment picture to the sensing equipment.

In the aspect, the terminal equipment provides an environment picture for the sensing equipment, so that the sensing equipment sends a real-environment-picture request to the terminal equipment when the sensing equipment is needed to display a real environment picture. Since the camera of the terminal equipment is in an off state in the process of displaying a virtual environment picture by the sensing equipment, the terminal equipment, when receiving the real-environment-picture request, may turn on the camera at first, shoot a real environment through the camera to acquire a real environment picture, and then sends the real environment picture to the sensing equipment, and then the sensing equipment displays the real environment picture.

In a possible implementation mode, the terminal equipment may be configured with a front camera and a rear camera. When receiving the real-environment-picture request, the terminal equipment may shoot a real environment through the front camera, or may also shoot a real environment through the rear camera. The specific camera which is adopted may be determined by the terminal equipment as a default or may be preset by the user, which is not limited in the aspect.

In Step 405, when receiving the real environment picture, the sensing equipment switches a currently displayed virtual environment picture to the real environment picture.

When the terminal equipment sends the real environment picture to the sensing equipment, the sensing equipment cancels a currently displayed virtual environment picture, and displays the real environment picture. At this moment, the user may view the real environment picture, know about the real environment and timely judge and process the emergency in the real environment, so that an adverse consequence caused by an incapability of seeing the real environment is avoided. Safety is thus improved.

In Step 406, when a preset recovery operation of a user is detected in a virtual environment in a process of displaying a real environment picture, the sensing equipment sends a virtual-environment-picture request to the terminal equipment.

The preset recovery operation is configured to indicate recovery from a current real environment picture to a virtual environment picture, which may be a clicking operation over a recovery option provided in the virtual environment or an operation of producing a recovery indication sound or the like, which is not limited in the aspect. The user may trigger the preset recovery operation to control the sensing equipment to re-display the original virtual environment picture.

That is, when the user triggers the preset recovery operation, the sensing equipment detects the preset recovery operation to send a virtual-environment-picture request to the terminal equipment to request for displaying a virtual environment picture.

In the aspect, after the virtual environment picture is quitted, the user may trigger the preset recovery operation when completing processing the emergency and being expected to recover the virtual environment picture. Flexibility is high, and a requirement of the user on two-way switching between a virtual environment picture and a real environment picture can be satisfied.

In Step 407, when receiving the virtual-environment-picture request from the sensing equipment, the terminal equipment acquires a virtual environment picture which is stored when the real-environment-picture request is received.

In Step 408, the terminal equipment sends the virtual environment picture to the sensing equipment.

In Step 409, when receiving the virtual environment picture, the sensing equipment switches a currently displayed real environment picture to the virtual environment picture.

In the aspect, in Step 403, when receiving the real-environment-picture request, the terminal equipment not only sends the shot real environment picture to the sensing equipment, but also may store a virtual environment picture at this moment, so that the virtual environment picture may be subsequently recovered and displayed.

Therefore, in the process of displaying a real environment picture by the sensing equipment, when receiving a virtual-environment-picture request, the terminal equipment extracts the stored virtual environment picture and sends it to the sensing equipment. In addition, the camera which has been turned on may also be turned off not to shoot the real environment picture any longer.

It is to note that Steps 406-408 are described with recovering of a virtual environment picture according to the preset recovery operation triggered by the user as an example. In another possible implementation mode, when being expected to recover the original virtual environment picture, the user may manually turn off the camera, and the camera will not shoot a real environment any longer after being turned off. When detecting a turning-off operation of the user over the camera, the terminal equipment acquires a virtual environment picture which is stored when the real-environment-picture request is received, and sends the virtual environment picture to the sensing equipment, and the sensing equipment displays the virtual environment picture.

In another example provided by the aspect, the terminal equipment may have not stored a virtual environment picture before. Then, when the user triggers the preset recovery operation or the turning-off operation over the camera, the terminal equipment may re-determine and send to the sensing equipment a virtual environment picture to be displayed for the sensing equipment to display. The re-displayed virtual environment picture may be a virtual environment picture selected by the user or a virtual environment picture to be displayed by the terminal equipment as a default, or the like, which is not limited in the aspect.

According to the method provided by the aspect, the acceleration of the sensing equipment is acquired through the sensing equipment, a real-environment-picture request is sent to the terminal equipment when the variation of the acceleration is larger than the preset variation, the terminal equipment turns on the camera on the terminal equipment according to the real-environment-picture request, acquires a real environment picture, and sends the real environment picture to the sensing equipment, and the sensing equipment switches the virtual environment picture to the real environment picture. Therefore, when the acceleration greatly varies, the user may be ensured to timely see the real environment picture and know about the real environment to further timely process the emergency in the real environment, and the safety is improved. In addition, when completing processing the emergency in the real environment, the user may trigger the preset recovery operation to re-view the virtual environment picture. The flexibility is high, and the requirement of the user on two-way switching between a virtual environment picture and a real environment picture is met.

Figure 5:
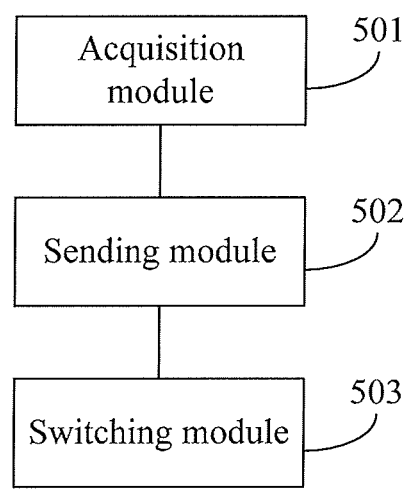
FIG. 5 is a block diagram of a device for switching an environment picture, according to an exemplary aspect of the present disclosure.

FIG. 5 is a block diagram of a device for switching an environment picture, according to an exemplary aspect. Referring to FIG. 5, the device includes an acquisition module 501, a sending module 502 and a switching module 503.

The acquisition module 501 is configured to acquire an acceleration of sensing equipment through a configured acceleration sensor.

The sending module 502 is configured to, when a variation of the acceleration is larger than a preset variation, send a real-environment-picture request to terminal equipment, the terminal equipment being configured to turn on a camera of the terminal equipment and return a real environment picture shot by the camera.

The switching module 503 is configured to, when the real environment picture is received, switch a currently displayed virtual environment picture to the real environment picture.

According to the device provided by the aspect, the acceleration of the sensing equipment is acquired through the sensing equipment, a real-environment-picture request is sent to the terminal equipment when the variation of the acceleration is larger than the preset variation, the terminal equipment turns on the camera on the terminal equipment according to the real-environment-picture request, acquires a real environment picture, and sends the real environment picture to the sensing equipment, and the sensing equipment switches a virtual environment picture to the real environment picture. Therefore, when the acceleration greatly varies, a user may be ensured to timely see the real environment picture and know about a real environment to further timely process an emergency in the real environment, and safety is thus improved.

In a possible implementation mode, the sending module 502 is further configured to acquire a distance between the sensing equipment and a user through a configured distance sensor, and when the variation of the acceleration is larger than the preset variation and the distance is smaller than a preset distance, send the real-environment-picture request to the terminal equipment.

In another possible implementation mode, the sending module 502 is further configured to, when a preset recovery operation of the user is detected in a virtual environment in a process of displaying a real environment picture, send a virtual-environment-picture request to the terminal equipment, the terminal equipment being configured to return a virtual environment picture; and the switching module 503 is further configured to, when the virtual environment picture is received, switch a currently displayed real environment picture to the virtual environment picture.

All of the above-mentioned optional technical solutions may be freely combined to form optional aspects of the present disclosure, which will not be elaborated herein one by one.

Figure 6:
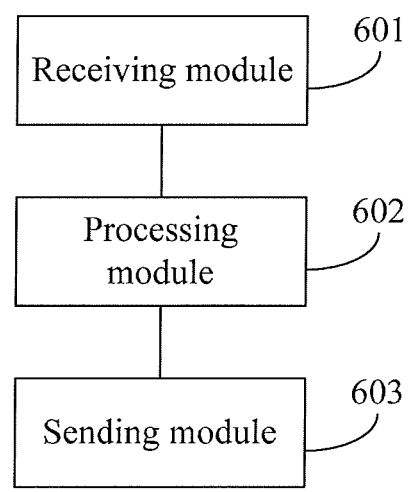
FIG. 6 is a block diagram of a device for switching an environment picture, according to an exemplary aspect of the present disclosure.

FIG. 6 is a block diagram of a device for switching an environment picture, according to an exemplary aspect. Referring to FIG. 6, the device includes a receiving module 601, a processing module 602 and a sending module 603.

The receiving module 601 is configured to receive a real-environment-picture request sent by sensing equipment, the real-environment-picture request being sent by the sensing equipment when it is determined that a variation of an acceleration is larger than a preset variation.

The processing module 602 is configured to turn on a camera of terminal equipment according to the real-environment-picture request, and acquire a real environment picture shot by the camera.

The sending module 603 is configured to send the real environment picture to the sensing equipment, the sensing equipment being configured to switch a currently displayed virtual environment picture to the real environment picture.

According to the device provided by the aspect, the acceleration of the sensing equipment is acquired through the sensing equipment, the real-environment-picture request is sent to the terminal equipment when the variation of the acceleration is larger than the preset variation, the terminal equipment turns on the camera on the terminal equipment according to the real-environment-picture request, acquires a real environment picture, and sends the real environment picture to the sensing equipment, and the sensing equipment switches a virtual environment picture to the real environment picture. Therefore, when the acceleration greatly varies, a user may be ensured to timely see the real environment picture and know about a real environment to further timely process an emergency in the real environment, and safety is thus improved.

Figure 7:
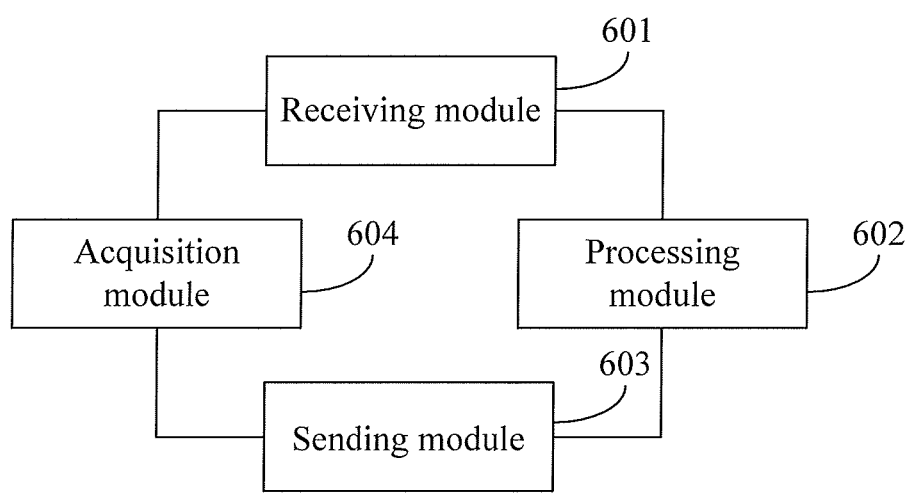
FIG. 7 is a block diagram of a device for switching an environment picture, according to an exemplary aspect of the present disclosure.

Referring to FIG. 7, in a possible implementation mode, the device further includes an acquisition module 604.

The acquisition module 604 is configured to, when a virtual-environment-picture request sent by the sensing equipment is received, acquire a virtual environment picture which is stored when the real-environment-picture request is received; and the sending module 603 is further configured to send the virtual environment picture to the sensing equipment, the sensing equipment being configured to switch a currently displayed real environment picture to the virtual environment picture.

In another possible implementation mode, the acquisition module 604 is further configured to, when a turning-off operation of a user over the camera is detected, acquire a virtual environment picture which is stored when the real-environment-picture request is received; and the sending module 603 is further configured to send the virtual environment picture to the sensing equipment, the sensing equipment being configured to switch a currently displayed real environment picture to the virtual environment picture.

With respect to the devices in the above aspects, the specific manners for performing operations for individual modules therein have been described in detail in the aspects regarding the method, which will not be elaborated herein.

It is to note that: when switching an environment picture, the devices for switching an environment picture provided by the aspects are only described with division of each of the above-mentioned function modules as an example. In a practical application, the above-mentioned functions may be allocated to different function modules for realization according to a requirement, that is, internal structures of the sensing equipment and the terminal equipment are divided into different function modules to realize all or part of the above-mentioned functions. In addition, the devices for switching an environment picture provided by the aspects belong to the same concept as the method aspects for switching an environment picture, and details about its specific implementation process may refer to the method aspects, and will not be elaborated herein.

Figure 8:
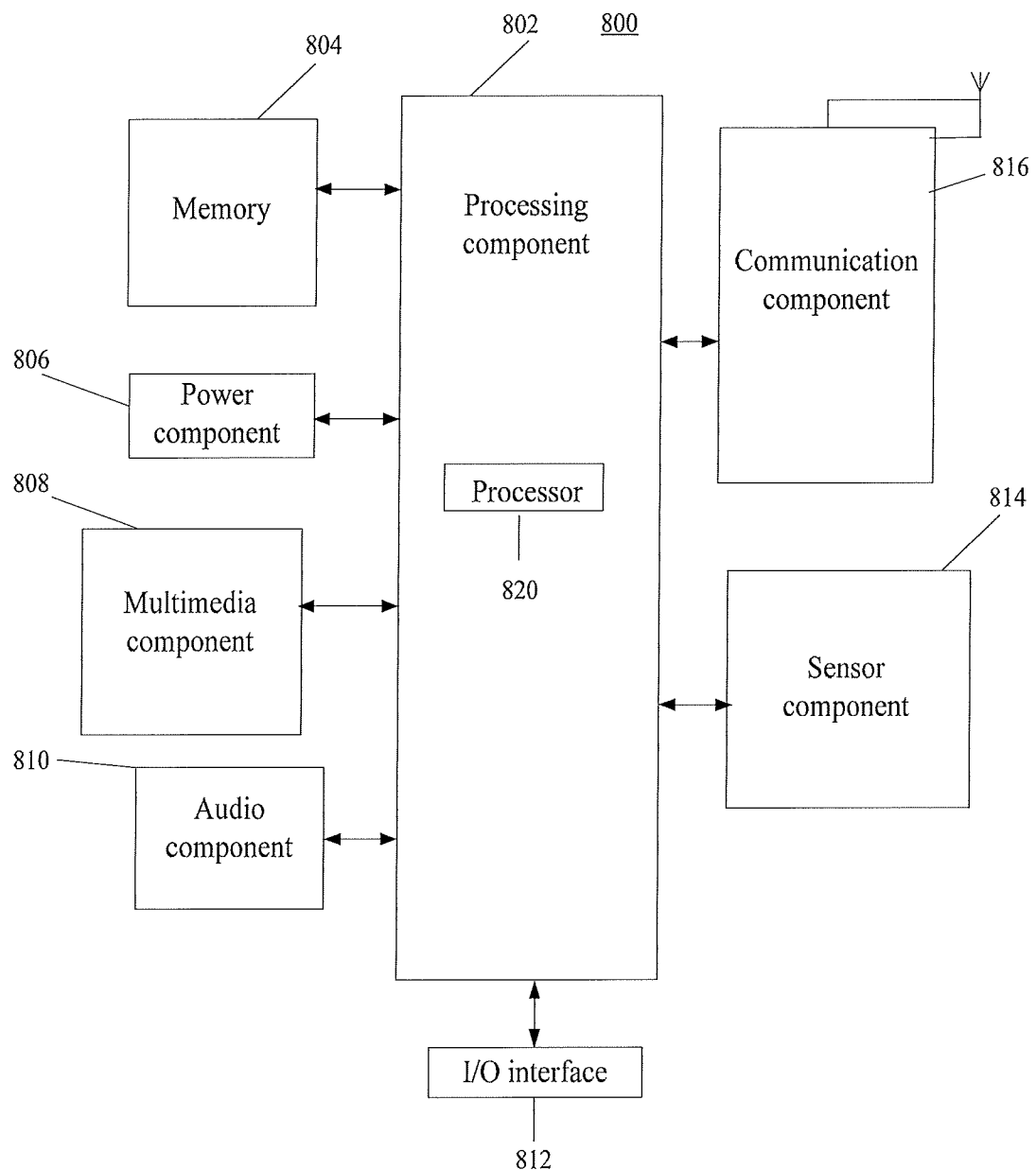
FIG. 8 is a block diagram of a device for switching an environment picture, according to an exemplary aspect of the present disclosure.

FIG. 8 is a block diagram of a device 800 for switching an environment picture, according to an exemplary aspect. For example, the device 800 may be a mobile phone, a computer, a digital broadcast terminal, a messaging device, a gaming console, a tablet, a medical device, exercise equipment, a personal digital assistant and the like.

Referring to FIG. 8, the device 800 may include at least one of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include at least one processor 820 to execute instructions to perform all or part of the steps in the above-mentioned method. Moreover, the processing component 802 may include at least one module which facilitates interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power for various components of the device 800. The power component 806 may include a power management system, one or more power supplies, and other components associated with the generation, management and distribution of power for the device 800.

The multimedia component 808 includes a screen providing an output interface between the device 800 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some aspects, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may be further stored in the memory 804 or sent through the communication component 816. In some aspects, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but are not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some aspects, the sensor component 814 may also include an acceleration sensor, a gyroscope sensor, a magnetic sensor, a pressure sensor or a temperature sensor.

The communication component 816 is configured to facilitate wired or wireless communication between the device 800 and other device. The device 800 may access a communication-standard-based wireless network, such as a Wireless Fidelity (WiFi) network, a 2nd-Generation (2G) or 3rd-Generation (3G) network or a combination thereof. In an exemplary aspect, the communication component 816 receives a broadcast signal or broadcast associated information from an external broadcast management system through a broadcast channel. In an exemplary aspect, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-Wide Band (UWB) technology, a Bluetooth (BT) technology and another technology.

In an exemplary aspect, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an exemplary aspect, there is also provided a non-transitory computer-readable storage medium including instructions, such as the memory 804 including instructions. The instructions may be executed by the processor 820 of the device 800 to implement the above-mentioned methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, instructions in the storage medium is executed by a processor of sensing equipment to enable the sensing equipment to execute a method for switching an environment picture, the method including that:

an acceleration of the sensing equipment is acquired through a configured acceleration sensor;

when a variation of the acceleration is larger than a preset variation, a real-environment-picture request is sent to terminal equipment, the terminal equipment being configured to turn on a camera of the terminal equipment and return a real environment picture shot by the camera; and when the real environment picture is received, a currently displayed virtual environment picture is switched to the real environment picture.

In a possible implementation mode, the step that the real-environment-picture request is sent to the terminal equipment when the variation of the acceleration is larger than the preset variation includes that:

a distance between the sensing equipment and a user is acquired through a configured distance sensor; and when the variation of the acceleration is larger than the preset variation and the distance is smaller than a preset distance, the real-environment-picture request is sent to the terminal equipment.

In another possible implementation mode, the method further includes that:

when a preset recovery operation of the user is detected in a virtual environment in a process of displaying a real environment picture, a virtual-environment-picture request is sent to the terminal equipment, the terminal equipment being configured to return a virtual environment picture; and when the virtual environment picture is received, a currently displayed real environment picture is switched to the virtual environment picture.

According to a non-transitory computer-readable storage medium, instructions in the storage medium is executed by a processor of terminal equipment to enable the terminal equipment to execute a method for switching an environment picture, the method including that:

a real-environment-picture request sent by sensing equipment is received, wherein the real-environment-picture request is sent by the sensing equipment when it is determined that a variation of an acceleration is larger than a preset variation;

a camera of the terminal equipment is turned on according to the real-environment-picture request, and a real environment picture shot by the camera is acquired; and the real environment picture is sent to the sensing equipment, the sensing equipment being configured to switch a currently displayed virtual environment picture to the real environment picture.

In a possible implementation mode, the method further includes that:

when a virtual-environment-picture request sent by the sensing equipment is received, a virtual environment picture which is stored when the real-environment-picture request is received is acquired; and the virtual environment picture is sent to the sensing equipment, the sensing equipment being configured to switch a currently displayed real environment picture to the virtual environment picture.

In another possible implementation mode, the method further includes that:

when a turning-off operation of a user over the camera is detected, a virtual environment picture which is stored when the real-environment-picture request is received is acquired; and the virtual environment picture is sent to the sensing equipment, the sensing equipment being configured to switch a currently displayed real environment picture to the virtual environment picture.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for managing a virtual environment in a technical field of virtual reality, applied to sensing equipment, a virtual reality technology being a technology for simulating a virtual environment to simulate a perceptive function for a user via virtual reality equipment, the virtual reality equipment including terminal equipment and the sensing equipment, the method comprising:
   receiving, by the sensing equipment, a virtual environment picture provided by the terminal equipment;
   generating, by the sensing equipment, the virtual environment;
   displaying the virtual environment picture in the virtual environment, wherein the user enters the virtual environment and views the virtual environment picture after wearing the sensing equipment, wherein the user sees no real environment picture but the virtual environment picture after entering the virtual environment through the virtual reality equipment;
   in a process of displaying the virtual environment picture, acquiring, by the sensing equipment, an acceleration of the sensing equipment through acceleration sensor;
   sending, by the sensing equipment, a real-environment-picture request to the terminal equipment to request for displaying a real environment picture when the variation of the acceleration is greater than the variation threshold, the terminal equipment being arranged to turn on a camera of the terminal equipment and return the real environment picture shot by the camera;
   receiving, by the sensing equipment, the real environment picture returned by the terminal equipment;
   switching, by the sensing equipment, the virtual environment picture currently displayed to the real environment picture to display the real environment picture, allowing the user to see the real environment picture; and
   when the variation of the acceleration is not larger than the variation threshold, continuing, by the sensing equipment, displaying the virtual environment picture.

2. The method of claim 1, wherein the sending the real-environment-picture request to the terminal equipment when the variation of the acceleration is greater than the variation threshold comprises:
   acquiring a distance between the sensing equipment and the user through a distance sensor;
   determining whether the distance is less than a distance threshold; and
   when the variation of the acceleration is greater than the variation threshold and the distance is less than the distance threshold, sending, by the sensing equipment, the real-environment-picture request to the terminal equipment.

3. The method of claim 1, further comprising:
   detecting, by the sensing equipment in the virtual environment in a process of displaying the real environment picture, a recovery operation of the user to recover the virtual environment picture;
   sending, by the sensing equipment, a virtual-environment-picture request to the terminal equipment to request for displaying the virtual environment picture, the terminal equipment being arranged to return the virtual environment picture which is stored when the real-environment-picture request is received, or return a virtual environment picture to be displayed as selected by the user or a virtual environment picture to be displayed by default, wherein the recovery operation is arranged to indicate recovery from a current real environment picture to the virtual environment picture, wherein the user triggers the recovery operation to control the sensing equipment to re-display an original virtual environment picture;
   receiving, by the sensing equipment, the virtual environment picture returned by the terminal equipment; and
   switching, by the sensing equipment, a currently displayed real environment picture to the virtual environment picture to display the virtual environment picture returned by the terminal equipment.

4. A device for managing a virtual environment in a technical field of virtual reality, applied to sensing equipment, a virtual reality technology being a technology for simulating a virtual environment to simulate a perceptive function for a user via virtual reality equipment, the virtual reality equipment comprising terminal equipment and the sensing equipment, the device comprising:
   a processor; and
   a memory configured to store instructions executable by the processor,
   wherein the processor is configured to:
      receive a virtual environment picture provided by the terminal equipment;
      generate the virtual environment;
      display the virtual environment picture in the virtual environment, wherein the user enters the virtual environment and views the virtual environment picture after wearing the sensing equipment, wherein the user sees no real environment picture but the virtual environment picture after entering the virtual environment through the virtual reality equipment;
      in a process of displaying the virtual environment picture, acquire acceleration of the sensing equipment through an acceleration sensor;
      compare a variation of the acceleration to a variation threshold;

determine whether the variation of the acceleration is greater than the variation threshold;

send a real-environment-picture request to the terminal equipment to request for displaying a real environment picture when the variation of the acceleration is greater than the variation threshold, the terminal equipment being arranged to turn on a camera of the terminal equipment and return the real environment picture shot by the camera;

receive the real environment picture returned by the terminal equipment;

switch the virtual environment picture currently displayed to the real environment picture to display the real environment picture, to allow the user to see the real environment picture; and when the variation of the acceleration is not larger than the variation threshold, continue displaying the virtual environment picture.

5. The device of claim 4, wherein the processor is further configured to:

acquire a distance between the sensing equipment and the user through a distance sensor;

determine whether the distance is less than a distance threshold; and when the variation of the acceleration is greater than the variation threshold and the distance is less than the distance threshold, send the real-environment-picture request to the terminal equipment.

6. The device of claim 4, wherein the processor is further configured to:

detect, in the virtual environment in a process of displaying the real environment picture, a recovery operation of the user to recover the virtual environment picture;

send a virtual-environment-picture request to the terminal equipment to request for displaying the virtual environment picture, the terminal equipment being arranged to return the virtual environment picture which is stored when the real-environment-picture request is received, or return a virtual environment picture to be displayed as selected by the user or a virtual environment picture to be displayed by default, wherein the recovery operation is arranged to indicate recovery from a current real environment picture to the virtual environment picture, wherein the user triggers the recovery operation to control the sensing equipment to re-display an original virtual environment picture;

receive the virtual environment picture returned by the terminal equipment; and switch a currently displayed real environment picture to the virtual environment picture to display the virtual environment picture returned by the terminal equipment.

7. A device for managing a virtual environment in a technical field of virtual reality, applied to terminal equipment, a virtual reality technology being a technology for simulating a virtual environment to simulate a perceptive function for a user via virtual reality equipment, the virtual reality equipment comprising the terminal equipment and sensing equipment, the device comprising:

a processor; and a memory configured to store instructions executable by the processor, wherein the processor is configured to:

provide a virtual environment picture for the sensing equipment, the sensing equipment being arranged to generate the virtual environment, and display the virtual environment picture in the virtual environment, wherein the user enters the virtual environment and views the virtual environment picture after wearing the sensing equipment, wherein the user sees no real environment picture but the virtual environment picture after entering the virtual environment through the virtual reality equipment;

receive a real-environment-picture request sent by the sensing equipment, the sensing equipment being arranged to, in a process of displaying the virtual environment picture, acquire an acceleration of the sensing equipment through an acceleration sensor, compare a variation of the acceleration to a variation threshold, determine whether the variation of the acceleration is greater than the variation threshold, send the real-environment-picture request to the terminal equipment to request for displaying a real environment picture when the variation of the acceleration is greater than the variation threshold;

turn on a camera of the terminal equipment; and return the real environment picture shot by the camera to the sensing equipment, the sensing equipment being arranged to switch the virtual environment picture currently displayed to the real environment picture to display the real environment picture, to allow the user to see the real environment picture, and continue displaying the virtual environment picture when the variation of the acceleration is not larger than the variation threshold.

8. The device of claim 7, wherein the processor is further configured to:

store the virtual environment picture in response to receiving the real-environment-picture request;

receive a virtual-environment-picture request sent by the sensing equipment, the sensing equipment being arranged to detect, in the virtual environment in a process of displaying the real environment picture, a recovery operation of the user to recover the virtual environment picture, send the virtual-environment-picture request to the terminal equipment to request for displaying the virtual environment picture, wherein the recovery operation is arranged to indicate recovery from a current real environment picture to the virtual environment picture, wherein the user triggers the recovery operation to control the sensing equipment to re-display an original virtual environment picture;

acquire the virtual environment picture which is stored when the real-environment-picture request is received, or acquire a virtual environment picture to be displayed as selected by the user or a virtual environment picture to be displayed by default; and return, to the sensing equipment, the virtual environment picture acquired, the sensing equipment being arranged to switch a currently displayed real environment picture to the virtual environment picture to display the virtual environment picture returned by the terminal equipment.

9. The device of claim 7, wherein the processor is further configured to:

store the virtual environment picture in response to receiving the real-environment-picture request;

detect a deactivation of the camera;

acquire, in response to the deactivation of the camera, the virtual environment picture which is stored when the real-environment-picture request is received, or acquire a virtual environment picture to be displayed as selected by the user or a virtual environment picture to be displayed by default; and return, to the sensing equipment, the virtual environment picture acquired, the sensing equipment being arranged to switch a currently displayed real environment picture to the virtual environment picture to display the virtual environment picture returned by the terminal equipment.

10. A non-transitory computer-readable storage medium having stored therein instructions that, when executed by one or more processors of a device, cause the device to execute a method for managing a virtual environment in a technical field of virtual reality, the method applying to sensing equipment, a virtual reality technology being a technology for simulating a virtual environment to simulate a perceptive function for a user via virtual reality equipment, the virtual reality equipment comprising terminal equipment and the sensing equipment, the method comprising:

receiving a virtual environment picture provided by the terminal equipment;

generating the virtual environment, and displaying the virtual environment picture in the virtual environment, wherein the user enters the virtual environment and views the virtual environment picture after wearing the sensing equipment, wherein the user sees no real environment picture but the virtual environment picture after entering the virtual environment through the virtual reality equipment;

in a process of displaying the virtual environment picture, acquiring an acceleration of the sensing equipment through an acceleration sensor;

comparing a variation of the acceleration to a variation threshold;

determining whether the variation of the acceleration is greater than the variation threshold;

sending a real-environment-picture request to the terminal equipment to request for displaying a real environment picture when the variation of the acceleration is greater than the variation threshold, the terminal equipment being arranged to turn on a camera of the terminal equipment and return the real environment picture shot by the camera;

receiving the real environment picture returned by the terminal equipment; and switching the virtual environment picture currently displayed to the real environment picture to display the real environment picture, allowing the user to see the real environment picture; and when the variation of the acceleration is not larger than the variation threshold, continuing displaying the virtual environment picture.

* * * * *